various
2,736,636
CHLORINE DIOXIDE PRODUCTION

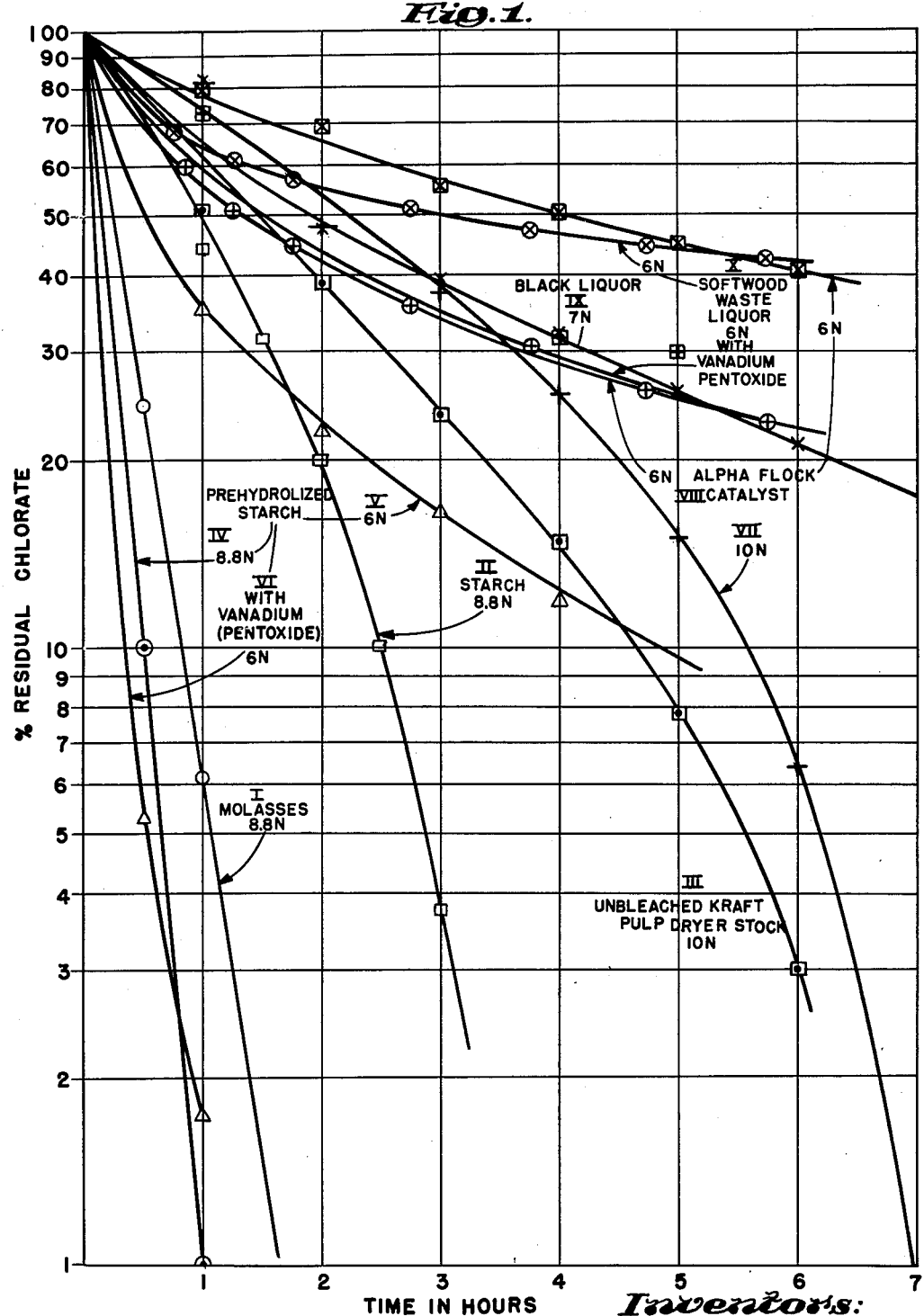

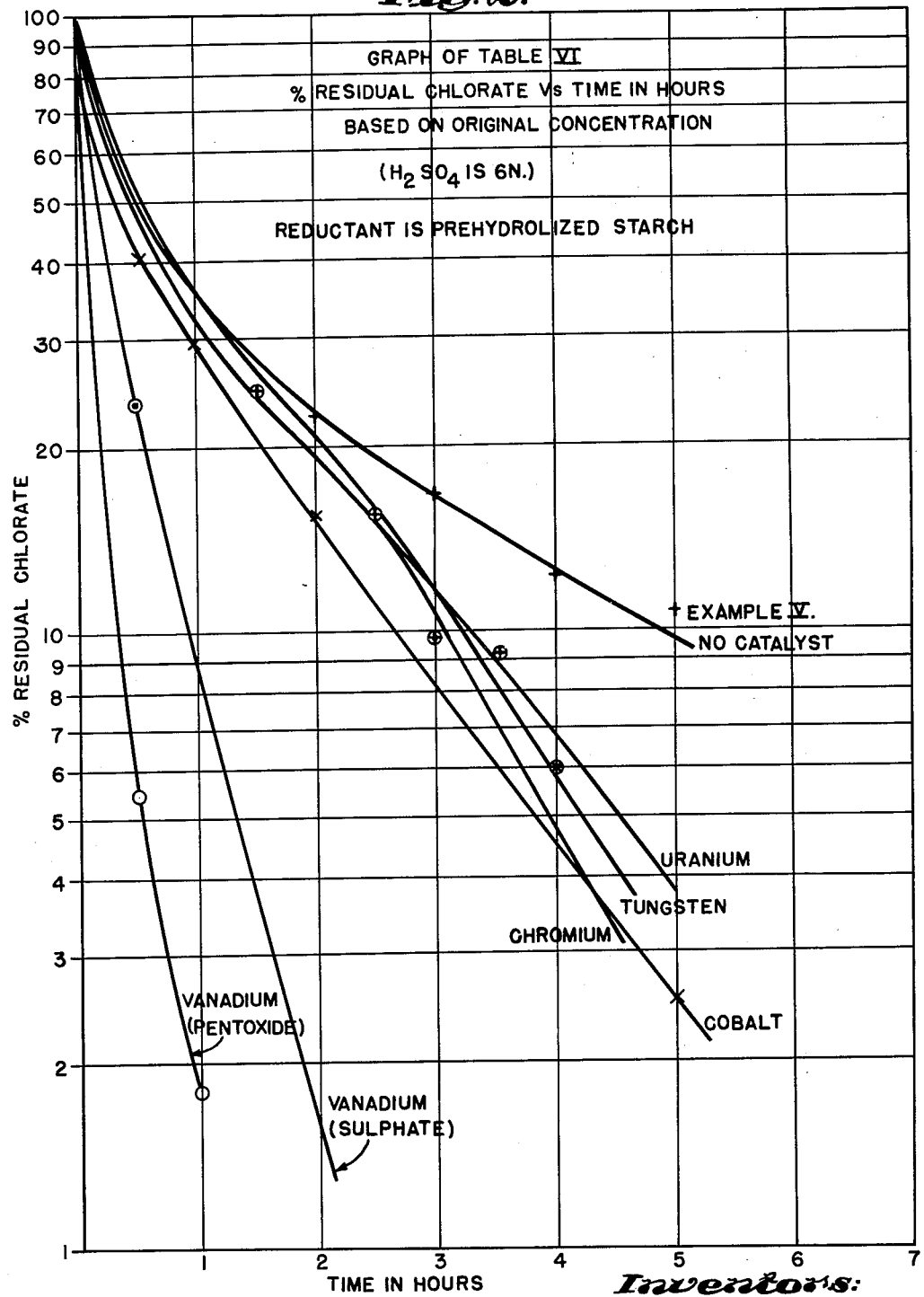

George A. Day, Berlin, and Edward F. Fenn, Gorham, N. H., assignors to Brown Company, Berlin, N. H., a corporation of Maine Application June 20, 1951, Serial No. 232,506

20 Claims. (Cl. 23—152)

The invention is concerned with the production of chlorine dioxide from soluble inorganic chlorates. The primary object of this invention is the economical production of chlorine dioxide with high conversions of chlorate and with the active chlorine content substantially entirely in chlorine dioxide form.

In one type of known process for the production of chlorine dioxide from chlorate, elemental chlorine is present with the chlorine dioxide in such great amounts as to require supplemental separation steps to rid the gas of the undesirably high chlorine content, cf. Vincent Patent No. 2,036,375, White Patent No. 2,036,311 and Cunningham Patent No. 2,317,443. Such processes involve the extra cost of separation equipment and operation.

Another process designed to secure substantially chlorine-free chlorine dioxide, set forth in Mathieson British Patent No. 575,173, involves the use of enormous excesses of highly concentrated acid and hence is economically deficient.

The process of the present invention, like that of the British patent referred to above, but unlike those of the United States patents referred to above, produces chlorine dioxide so free of chlorine that no supplemental separation step is necessary, chlorine dioxide purity being usually at least 89% by weight of the mixed gases and often much higher (the corresponding purity, on an active chlorine basis[1], being usually at least 95%). But the present process, unlike that of the British patent, is carried out with much more economically attractive quantities of far less concentrated acid.

British Mathieson Patent No. 575,173 uses theoretical proportions of reductant, and specifically warns against use of any excess of reductant, even though it be small, considering any excess as causing the formation of undesirably increased quantities of chlorine.

We have found that this teaching of Mathieson does not hold provided that one operates in entirely different ranges of acid proportions and avoids the highly concentrated solutions utilized in the British Mathieson patent. Thus, in a process involving reaction between soluble inorganic chlorate and non-gaseous, i. e. liquid and solid, reductants, we have secured high chlorine dioxide purity and high reaction efficiencies with the use of excess proportions of reductant and relatively small excess of far less concentrated sulphuric acid, the permissible concentrations of acid being particularly low, in the presence of excess reductant proportion, when catalysts, as hereinafter described, are present.

Accordingly, the present invention is directed to the production of chlorine dioxide by the use of increased amounts of reductant with simultaneous utilization of much less expensive quantities of acids with or without catalysts.

Moreover, we have found that, when the acid quantities and concentrations are held within our range, desirably improved rates of reaction are secured, even in the absence of catalysts, with the presence of the excess quantities of reductant over that secured with the use of only theoretical proportions of reductant.

By excess proportion of reductant, we mean in the range of 60% to about 220% excess of reductant over the theoretical stoichiometric proportion. By small excess of sulphuric acid, we mean at least 1 mol of sulphuric acid for each mol of chlorate but not substantially more than 3 mols of sulphuric acid per mol of chlorate in contrast to the 21 to 27 mols of acid to 1 mol of chlorate utilized by Mathieson. By less concentrated solutions of sulphuric acid we mean between 4 N (about 18%) and 14 N (about 49%) with respect to the content of free acid in the initial reaction solution (the concentration to be used varying in general inversely with the temperature chosen for reaction), in contrast to the different higher concentration range of Mathieson. At a reaction temperature around 65° C. we prefer to use an initial concentration of around 9 N (35%), which may be reduced to about 6 N if catalysts are used. The conditions of reaction, with or without catalysts, should be such that the concentration of sulphuric acid in the reacting mixture is maintained, and remains upon completion of the reaction, at not less than 3 N (about 13%) but not in excess of 14 N (about 49%).

Conversions under our process, i. e., the total chlorine equivalent of the chlorine dioxide and chlorine produced, as compared with the chlorine equivalent of the chlorate input, is ordinarily that corresponding to substantially complete chlorate decomposition, namely, substantially 100% of the chlorine eqiuvalent of the chlorate input.

Our yields, i. e., the amount of chlorine dioxide produced as compared with the theoretical amount of chlorine dioxide that could be produced, are usually above 80%.

Our efficiency, i. e., the fraction of chlorate decomposed to form chlorine dioxide is above 80% since, with the conversion substantially 100%, the efficiency corresponds with the yield.

Our purity, i. e., the amount of chlorine dioxide produced as compared with the total amount of chlorine dioxide and chlorine produced, ordinarily ranges above about 89% by weight. Such purities correspond to an active chlorine content in the form of chlorine dioxide of at least about 95%.

In the process, the following equations represent the courses of reaction:

(1) $2NaClO_3 + \frac{1}{2}C + H_2SO_4 \rightarrow 2ClO_2 + \frac{1}{2}CO_2 + H_2O + Na_2SO_4$ (2) $2NaClO_3 + C + H_2SO_4 \rightarrow Cl_2 + Na_2SO_4 + CO_2 + 2O_2 + H_2O$ Where the concentration and quantity of sulphuric acid is properly held as above stated, Reaction 1 is strongly favored over Reaction 2.

Typical procedures in accordance with this invention are now given, each of the procedures being illustrated by a curve in the drawings which plot per cent residual chlorate against elapsed time in hours, using semi-logarithmic coordinates. The generally straight line curve characteristics demonstrate that the net reaction is in effect of the first order, i. e., the rate of reaction is substantially proportional to the amount of chlorate present.

*Example 1.*—A solution containing 25.6 grams of inorganic chlorate—sodium chlorate—47.5 grams sulphuric acid, 7.1 grams of commercial molasses and 79 grams of water was prepared and placed in a reaction flask connected through an inlet to a source of air and through an outlet to two gas absorption bottles connected in series, each containing approximately 300 cc. of 10% neutral KI. The initial acid concentration was thus ---
[1] By active chlorine, we mean equivalent available chlorine.

8.8 N (about 34%) and the acid-chlorate molar ratio 2:1. The reductant was present in 200% excess.

Air was passed through the flask at a rate of about 900 cc. per minute. The flask was heated to approximately 50° C., the heat of reaction carrying the temperature up to 65° C. where it was maintained for 2 hours, in which time the chlorate was completely consumed. The absorption solutions were periodically removed and analyzed and replaced with fresh solutions.

The total chlorine dioxide found was 13.18 grams, and the total chlorine 1.59 grams, the overall gas purity thus being 89.3% and the yield 81%.

Table I

[With molasses and 8.8 N (about 34%) $H_2SO_4$.]

| Time, Hours | $NaClO_3$ Decomposed, Percent | Products Formed | | Yield | Purity (Cumulative) | |
|---|---|---|---|---|---|---|
| | | Gms. $ClO_2$ | Gms. $Cl_2$ | | Percent by Weight | Percent on Total Active Chlorine Basis |
| ½ | 75.4 | 10.42 | 0.97 | -------- | 92 | 97 |
| 1 | 93.8 | 12.65 | 1.34 | -------- | 91 | 96.4 |
| 1½ | 98.4 | 13.10 | 1.51 | -------- | 90 | 96 |
| 2 | 100 | 13.18 | 1.59 | 81 | 89.3 | 95.7 |

*Example II.*—In another similar example of procedure, a solution containing 26 grams of chlorate, 47.7 grams of $H_2SO_4$, 5 grams of starch and 88 grams of water was prepared and the process operated at a temperature of 65° C. The initial acid concentration was thus 8.8 N (about 34%), the molar acid-chlorate ratio 2:1, and the excess reductant 204%.

Table II

[Starch with 8.8 N (about 34%) $H_2SO_4$.]

| Time, Hours | $NaClO_3$ Decomposed, Percent | Products Formed | | Yield | Purity (Cumulative) | |
|---|---|---|---|---|---|---|
| | | Gms. $ClO_2$ | Gms. $Cl_2$ | | Percent by Weight | Percent on Total Active Chlorine Basis |
| 1 | 56 | 7.35 | 0.49 | -------- | 93 | 97 |
| 1½ | 68.5 | 9.85 | 0.74 | -------- | 93 | 97 |
| 2 | 80 | 11.40 | 0.94 | -------- | 92 | 97 |
| 2½ | 90.8 | 12.80 | 1.15 | -------- | 92 | 97 |
| 3 | 96.2 | 13.40 | 1.25 | -------- | 91 | 96 |
| 4 | 100 | 13.93 | 1.39 | 84.5 | 91 | 96 |

*Example III.*—In another example of procedure, 30 grams of sodium chlorate, 5 grams of unbleached kraft pulp dryer stock cut into ¼-inch squares and 70 cc. 10 N (about 38%) $H_2SO_4$ were mixed and heated at 65° C. The molar acid-chlorate ratio was 1.2:1 and the excess of reductant was 155%.

Table III

[With unbleached kraft pulp dryer stock and 10 N (about 38%) $H_2SO_4$.]

| Time, Hours | $NaClO_3$ Decomposed, Percent | Products Formed | | Yield | Purity (Cumulative) | |
|---|---|---|---|---|---|---|
| | | Gms. $ClO_2$ | Gms. $Cl_2$ | | Percent by Weight | Percent on Total Active Chlorine Basis |
| 1 | 48 | 7.3 | 0.67 | -------- | 92 | 97 |
| 2 | 61 | 9.3 | 0.80 | -------- | 92 | 97 |
| 3 | 76 | 11.7 | 0.86 | -------- | 93 | 97 |
| 4 | 85 | 13.0 | 0.94 | -------- | 93 | 97 |
| 5 | 92 | 14.1 | 1.06 | -------- | 93 | 97 |
| 6 | 97 | 14.8 | 1.11 | -------- | 93 | 97 |
| 7 | 100 | 15.4 | 1.24 | 86.7 | 93 | 97 |

Substantially more rapid reaction occurs if starch is pre-hydrolyzed.

*Example IV.*—Ten grams of starch was pre-hydrolyzed by adding it to 100 grams of sulphuric acid and 100.4 grams of water and heating for 18 minutes at 65° C. This mixture was allowed to cool and then added to the flask containing 50 grams of sodium chlorate dissolved in 57 grams of water. The acid-chlorate ratio was thus 2.4:1, and the excess of reductant was 214%. The reaction generated sufficient heat to carry the temperature to 70°; it remained there for 20 minutes, after which sufficient heat was supplied to maintain the temperature at 65°–70° C. The reaction proceeded smoothly and rapidly. The following table summarizes the results:

Table IV

[With pre-hydrolyzed starch and 8.8 N (about 34%) $H_2SO_4$.]

| Time, Hours | Conversion of Chlorate, Percent | Yield, Percent | Gas Purity (Cumulative) | |
|---|---|---|---|---|
| | | | Percent by Weight | As Percent Active Chlorine |
| ½ | 90 | -------- | 91 | 96.3 |
| 1 | 100 | 83 | 90 | 96.0 |

*Example IV–A.*—To show the effect of differing quantity of excess reductant, the percent excess reductant over theoretical stoichiometric ratio was varied. In this case, the basic procedure was carried out as follows: Ten grams of starch was pre-hydrolyzed with 95 grams of sulphuric acid in 100 grams of water by digesting for about ½ hour at about 70° C. The solution was cooled and then added to 50 grams of sodium chlorate in 57 grams of water in a flask, connected as before. Heat was applied to reach a temperature of 65°–70° C. which was maintained throughout the reaction. The acid-chlorate ratio was thus 2.06:1 and the excess of reductant was 215%.

In other similar experiments, the quantity of starch was adjusted to give varied percent excess starch over the theoretical stoichiometric. Table IV–A summarizes the results:

Table IV–A

| Percent Excess Starch | Time, Hours | Percent Consumption of Chlorate | Yield, Percent | Gas Purity (Cumulative) | |
|---|---|---|---|---|---|
| | | | | Percent by Weight | Percent on Total Active Chlorine Basis |
| 0 | 5 | ¹ 73 | 60 | 90 | 96.0 |
| 58 | 6 | 100 | 83 | 91 | 96.3 |
| 136 | 3 | 100 | 83 | 91 | 96.3 |
| 215 | 2½ | 100 | 82 | 90 | 96.0 |

¹ Reductant entirely consumed and reaction ceased.

When the acid concentration is reduced from 8.8 N to 6 N, with the starch pre-hydrolyzed, the reaction time is substantially increased for securing total conversion, as follows.

*Example V.*—Ten grams of starch were pre-hydrolyzed by adding the starch to 60 grams of sulphuric acid and 98 grams of water and heating from 20 to 30 minutes at about 75° C. This mixture was allowed to cool and then added to a flask containing 50 grams of sodium chlorate dissolved in 57 grams of water. The reaction flask was connected to a neutral KI absorber. Gentle heating was applied to carry the reaction up to 55° C. whereupon the reaction generated sufficient heat to carry the temperature up to 65°–70° C. where it was maintained until substantially complete consumption of chlorate.

The initial acid concentration was thus 6 N (about 25%) and the acid-chlorate molar ratio was 1.3:1.0. The reductant was present in 215% excess over stoichiometric with respect to the chlorate.

Air was passed through the flask at the rate of about 900 cc. per minute. The residual chlorate at the end of 1 hour was 3.5% and at the end of only 5 hours was 10.7%, but the yield was 80% and the purity was excellent.

Table V

| Time, Hours | NaClO₃ Decomposed, Percent | Yield, Percent | Purity | |
|---|---|---|---|---|
| | | | Percent by Weight | Percent on Chlorine Equivalent Basis |
| 1 | 35 | | | |
| 2 | 22.4 | | | |
| 3 | 16.7 | | | |
| 4 | 12.2 | | | |
| 5 | 10.7 | | | |
| 6 | 4.5 | 80 | 89 | 96 |

The greater rate of reaction secured in the case of the use of 8.8 N acid concentration (Example IV) may, however, be achieved with the use of almost 50% less acid concentration (i. e. at 6 N, as in Example V), if a catalyst in the form of vanadium is present. Other useful, but less dramatic catalysts are cobalt, uranium, molybdenum, copper, iron, cerium, nickel, cadmium, chromium, tungsten.

*Example VI.*—The procedure of Example V was carried out except that .23% of vanadium pentoxide was added to the flask. The effects in the case of use of vanadium sulphate, cobalt oxide, uranium acetate, chromium sulphate and the precipitate of tungstic acid are also shown in the following Table VI.

The curves of these reaction rates are also shown in Fig. 2, compared to a repetition of the pre-hydrolyzed starch at 6 N of Example V, i. e. without the catalyst.

Table VI-A

[Reactions to form ClO₂ in 6 N acid at a temperature 65°–70° C. arranged in order of increasing reaction times for 90% decomposition, as calculated from the minus first order reaction constants.]

| Catalyst | # Hrs. For 90% Decomp. | Percent Time Ratio Catalytic/ave. Control |
|---|---|---|
| Vanadium Pentoxide | .32 | 7.0 ⎱ 16% |
| Vanadium Sulphate | 1.00 | 21.6 ⎰ |
| Cobalt Oxide | 2.87 | 62 |
| Mercuric Oxide | 2.95 | 64 |
| Chromium Sulphate | 3.06 | 67 |
| Tungstic Acid | 3.19 | 69 |
| Uranyl Acetate | 3.24 | 70 |
| Nickel Chloride | 3.24 | 70 |
| Titanium Sulphate | 3.29 | 71 |
| Copper Oxide | 3.29 | 71 |
| Cobalt Oxide | 3.34 | 72 |
| Molybdic Acid | 3.38 | 73 |
| Copper Sulphate | 3.49 | 76 |
| Zinc Sulphate | 3.54 | 77 |
| Manganous Sulphate | 3.54 | 77 |
| Ammonium Molybdate | 3.60 | 78 |
| Ferrous Sulphate | 3.72 | 81 |
| Platinum Gauze | 3.72 | 81 |
| Cadmium Sulphate | 3.84 | 83 |
| Bismuth Nitrate | 3.84 | 83 |
| Thallium Sulphate | 4.19 | 91 |
| Manganese Dioxide | 4.19 | 91 |
| Chromium Metal | 4.26 | 92 |
| Osmium Tetroxide | 4.26 | 92 |
| Celenium Metal | 4.43 | 94 |
| Average No. Catalyst | 4.62 | 100 |
| No catalyst (Starch not pre-hydrolyzed) | 6.40 | 139 |

$$e^{kt} = \frac{1}{1-D}$$

Table VI

[Percent residual chlorate versus elapsed time of reaction from inception for typical experiments in accordance with procedure in 6 N acid percent residual chlorate.]

| Time, Hours | No. Catalyst, Example V | Vanadium | | Cobalt | Uranium | Chromium | Tungsten |
|---|---|---|---|---|---|---|---|
| ½ | 46.4 | 23.7 | 5.3 | 40.9 | 50.6 | 49.8 | 56.0 |
| 1 | 35.0 | 11.0 | 1.8 | 29.8 | 34.4 | 34.5 | 35.2 |
| 1½ | | 6.2 | 0 | 24.2 | 24.3 | 27.2 | 28.0 |
| 2 | 22.4 | 1.1 | | 15.5 | 18.7 | | |
| 2½ | | | | | 15.3 | 16.2 | 17.1 |
| 3 | 16.7 | | | 9.7 | | | |
| 3½ | | | | | 9.2 | 6.9 | 8.6 |
| 4 | 12.2 | | | 5.9 | | | |
| 4½ | | | | | 5.1 | 5.2 | 3.0 |
| 5 | 10.7 | | | 2.6 | | | |
| Overall Purity, Percent by Wt. ClO₂ | 89 | 89 | | 90 | 89 | 88 | 88 |
| Cl₂+ClO₂ Percent on Chlorine Equivalent Basis | 96 | 96 | | 96 | 96 | 95 | 95 |
| Yield, Percent | 80 | 80 | | 82 | 82 | 78 | 78 |
| Catalyst | None | Vanadium sulfate | Vanadium Pentoxide | Cobalt oxide | Uranium Acetate | Chromium Sulfate | ppt. of tungstic acid |
| Concentration of Catalyst | | 0.25% | .23% | .20% | .20% | .20% | .20% (remained partially insol.) |

As will be seen, particularly with the vanadium pentoxide, the reaction times become at 6 N acid concentration substantially as rapid as those secured in the absence of the catalyst with acid at almost a 50% greater concentration at 8.8 N, as illustrated previously in Example IV.

The following Table VI-A shows reaction times with other catalysts, presented in order of increasing reaction times for 90% decomposition.

here $D = .90$ (fraction decomposed), $t =$ time in hours.

$$e^{kt} = \frac{1}{1-.10} = 10$$

$$kt = 2.303$$

$$-k = \frac{2.303}{t}$$

Fig. 1 also shows the effects in the case of the use of alpha floc as the reductant at 10 N acid concentration without catalyst, at 6 N acid concentration with and without catalyst.

*Example VII.*—Thirty grams of inorganic chlorate-sodium chlorate, 5 grams of alpha flock (finely-ground purified wood pulp) and 70 cc. of 10 N (about 38%) sulphuric acid were placed in a reaction flask connected as before. The molar ratio of acid to chlorate was 1.2:1. The excess of reductant (alpha flock) was 155%.

Nitrogen gas was passed through the flask at a rate of about 900 cc./min. The flask was heated to 50° C., the heat of reaction carrying the temperature up to 65° C. where it was maintained until the chlorate was completely consumed. At the end of each hour, the absorption solutions were removed and analyzed and replaced with fresh solutions.

Table VII

[With alpha flock and 10 N (about 38%) $H_2SO_4$.]

| Time, Hours | $NaClO_3$ Decomposed, Percent | Products Formed | | Yield | Purity (Cumulative) | |
|---|---|---|---|---|---|---|
| | | Gms. $ClO_2$ | Gms. $Cl_2$ | | Percent by Weight | Percent on Total Active Chlorine Basis |
| 1 | 17 | 3.32 | 0.13 | | 96 | 98.5 |
| 2 | 51 | 9.86 | 0.59 | | 94 | 98 |
| 3 | 62 | 11.76 | 0.73 | | 94 | 98 |
| 4 | 74 | 13.34 | 0.86 | | 94 | 98 |
| 5 | 85 | 14.97 | 1.00 | | 94 | 98 |
| 6 | 93 | 16.07 | 1.14 | | 93 | 97 |
| 7 | 100 | 16.43 | 1.25 | 86.5 | 93 | 97 |

*Example VIII.*—Conditions and materials were identical with those set forth in Example V (i. e. at 6 N acid concentration), except that alpha flock was used as a reductant instead of pre-hydrolyzed starch and vanadium pentoxide in catalytic proportion was added to the reaction flask. In this case 79% of the chlorate was decomposed in 6 hours at a reaction temperature of 65° C. and the chlorine dioxide purity was 92% by weight. Without the catalyst present, the percentage of chlorate decomposed in 6 hours was 59.6% with a chlorine dioxide purity of 93% by weight.

*Example IX.*—A solution containing 25 grams of sodium chlorate, 21.9 grams of black liquor (i. e. waste liquor containing lignin and the other non-cellulosic material dissolved from wood during the manufacture of pulp by the kraft process) and sulphuric acid added as 74 cc. of 10 N acid giving a solution approximately 7 N (about 28%) sulphuric acid at the start of the reaction, was prepared and placed in a reaction flask connected as before. The molar ratio of initial sulphuric acid to chlorate was 1.6:1. The excess of reductant was 100%.

Nitrogen gas was passed through the flask at a rate of about 900 ccs. per minute. The flask was heated to 50° C., the heat of reaction carrying the temperature up to 65°–70° C., where it was maintained for 7 hours at which time 82% of the chlorate was consumed. At the end of each hour the absorption solutions were removed and analyzed and replaced with fresh solutions. At the end of 7 hours, the total chlorine dioxide which had been formed was 9.76 grams and the total chlorine 1.75 grams. The chlorate consumption and other data are shown in Table VIII, indicating that the liquor was somewhat less effective as a reagent than the molasses of Example I. The final concentration of the acid was approximately 5 N.

Table VIII

[With black liquor and 7 N (about 28%) $H_2SO_4$.]

| Time, Hours | $NaClO_3$ Decomposed, Percent | Products Formed | | Yield | Purity (Cumulative) | |
|---|---|---|---|---|---|---|
| | | Gms. $ClO_2$ | Gms. $Cl_2$ | | Percent by Weight | Total Active Chlorine Basis |
| 1 | 16.4 | 2.05 | 0.28 | | 88 | 95 |
| 2 | 52.1 | 6.07 | 1.15 | | 84 | 93 |
| 3 | 60.6 | 7.30 | 1.27 | | 81 | 92 |
| 4 | 67.6 | 8.19 | 1.38 | | 86 | 94 |
| 5 | 74.0 | 8.91 | 1.53 | | 85 | 94 |
| 6 | 78.5 | 9.41 | 1.66 | | 85 | 94 |
| 7 | 82.0 | 9.76 | 1.75 | 61 | 85 | 94 |

*Example X.*—Soft wood waste liquor from the kraft pulping process was used in proportion to give the same excess of reductant as the excess of starch in Example V but with sufficient additional acid to neutralize the alkaline liquor and to maintain the whole acid concentration at 6 N, vanadium pentoxide being present in catalytic proportion. In this case 76.8% of the chlorate was decomposed in 5¾ hours with a gas purity of 82%. Without the catalyst, the percentage of chlorate decomposed was 57.6% in 5¾ hours and a gas purity of 89% was achieved.

In the case of pre-hydrolyzed starch, no advantage by way of increased rates of reaction, or otherwise, has been observed with excesses of reductant over about 220%.

Both molasses and black liquor are of low volatility. Certain liquid organic reductants of high volatility such as carbon bisulphide may not be safely used in our process because of the danger of explosive reaction between the formed chlorine dioxide and organic matter in gaseous phase. Other organic reductants which can be safely used are alcohols, aldehydes, organic acids, sugars, etc.

The process is effective with any of the soluble inorganic chlorates of the alkali and alkaline earth metals, i. e. sodium, calcium, magnesium, potassium.

This application is a continuation-in-part of our previously filed applications Serial Nos. 91,627, now abandoned, and 134,840, now abandoned, filed May 5, 1949, and December 23, 1949, respectively.

We claim:

1. A method for high efficiency production of chlorine dioxide with at least 89% purity by weight which comprises reacting in aqueous solution a chlorate, selected from the group consisting of sodium, potassium, calcium and magnesium chlorates, with an excess of at least 60% above the theoretical stoichiometric proportion of a non-gaseous organic reducing agent in the presence of sulphuric acid in molar ratio to the chlorate between 1:1 and 3:1 and in a maintained concentration above about 3 N but not in excess of 14 N, until substantially all the chlorate is decomposed.

2. A method for the production of chlorine dioxide as claimed in claim 1, wherein the excess of organic reducing agent is about 215% above theoretical stoichiometric proportion.

3. A method for the production of chlorine dioxide as claimed in claim 1, wherein the reducing agent is starch.

4. A method for the production of chlorine dioxide as claimed in claim 1, wherein the reducing agent is cellulosic.

5. A method for the production of chlorine dioxide as claimed in claim 1, wherein the reducing agent is cellulose derived from wood.

6. A method for high efficiency production of chlorine dioxide with at least 89% purity by weight which comprises reacting in aqueous solution a chlorate, selected from the group consisting of sodium, potassium, calcium and magnesium chlorates, with an excess of at least 60% above the theoretical stoichiometric proportion of a non-gaseous organic reducing agent in the presence of sulphuric acid in molar ratio to the chlorate of about 2:1 and in a maintained concentration of about 9 N, until substantially all the chlorate is decomposed.

7. A method for the production of chlorine dioxide as claimed in claim 6, wherein the excess of organic reducing agent is about 215% above theoretical stoichiometric proportion.

8. A method for the production of chlorine dioxide as claimed in claim 1, wherein the reducing agent is a normally solid reducing agent.

9. A method for the production of chlorine dioxide as claimed in claim 6, wherein the reducing agent is a normally solid reducing agent.

10. A method for the production of chlorine dioxide as claimed in claim 9, wherein the normally solid reducing agent is hydrolyzed starch present in about 215 per cent above theoretical stoichiometric proportion.

11. A method for the production of chlorine dioxide as claimed in claim 1, wherein the reducing agent is a low vapor pressure organic liquid.

12. A method for the production of chlorine dioxide as claimed in claim 1, wherein the reducing agent is molasses.

13. A method for the production of chlorine dioxide as claimed in claim 1, wherein the reducing agent is black liquor recovered from kraft pulp production.

14. In processes for the production of chlorine dioxide involving the reduction of a soluble metallic chlorate selected from the group consisting of sodium, potassium, calcium and magnesium chlorates with a non-gaseous organic reducing agent in the presence of sulphuric acid, the improvement which comprises carrying out the reaction in aqueous solution with the sulphuric acid in molar ratio to the chlorate between 1:1 and 3:1 and at a maximum sulphuric acid concentration of 14 N in the presence of a catalyst selected from the group consisting of vanadium pentoxide, vanadium sulphate, cobalt oxide, uranium acetate, chromium sulphate and tungstic acid, and an amount of non-gaseous organic reducing agent at least 60% above theoretical stoichiometric proportion.

15. The improvement claimed in claim 14, wherein the catalyst is vanadium pentoxide.

16. The improvement claimed in claim 14, wherein the catalyst is cobalt oxide.

17. The improvement claimed in claim 14, wherein the catalyst is uranium acetate.

18. The improvement claimed in claim 14, wherein the catalyst is vanadium sulphate.

19. The improvement claimed in claim 14, wherein the catalyst is chromium sulphate.

20. A method for the production of chlorine dioxide of high purity which comprises reacting sodium chlorate in aqueous solution with an excess of about 215% above the theoretical stoichiometric proportion of a reducing agent in the form of pre-hydrolyzed starch in the presence of sulphuric acid in molar ratio to the chlorate between 1:1 and 3:1 and at an initial concentration of about 6 N, and a catalyst selected from the group consisting of vanadium pentoxide, vanadium sulphate, cobalt oxide, uranium acetate, chromium sulphate and tungstic acid.

References Cited in the file of this patent

UNITED STATES PATENTS

| | | |
|---|---|---|
| 1,904,190 | Becher | Apr. 18, 1933 |
| 2,335,808 | Soule | Nov. 30, 1943 |
| 2,373,830 | Holst | Apr. 17, 1945 |

FOREIGN PATENTS

| | | |
|---|---|---|
| 345,190 | Great Britain | Mar. 19, 1931 |
| 537,557 | Great Britain | June 26, 1941 |
| 575,173 | Great Britain | Feb. 6, 1946 |

OTHER REFERENCES

Handbook of Physics and Chemistry, by C. D. Hodgman, 28th ed., pages 486–487. Chemical Rubber Pub. Co., Cleveland.

Mellor's "Modern Inorganic Chemistry," single vol. ed., 1935, pages 666, 943. Longmans, Green and Co., New York.

"Outline of Organic Chemistry," revised, by Degering et al., 1937 ed., Barnes and Noble, Inc., N. Y.